J. W. RUGER & G. J. HILL.
Mechanism for Cutting and Sugaring Crackers.
No. 163,332. Patented May 18, 1875.
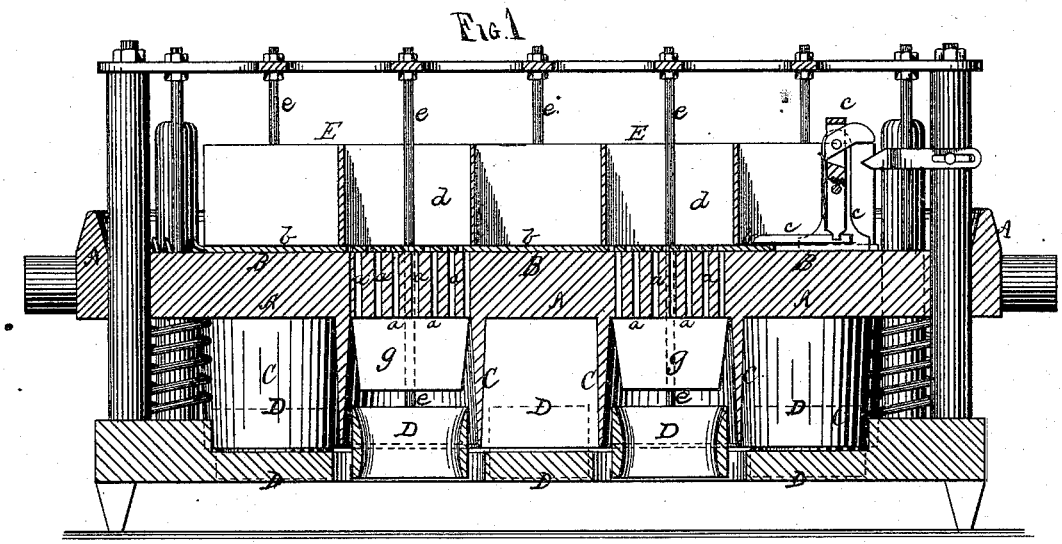
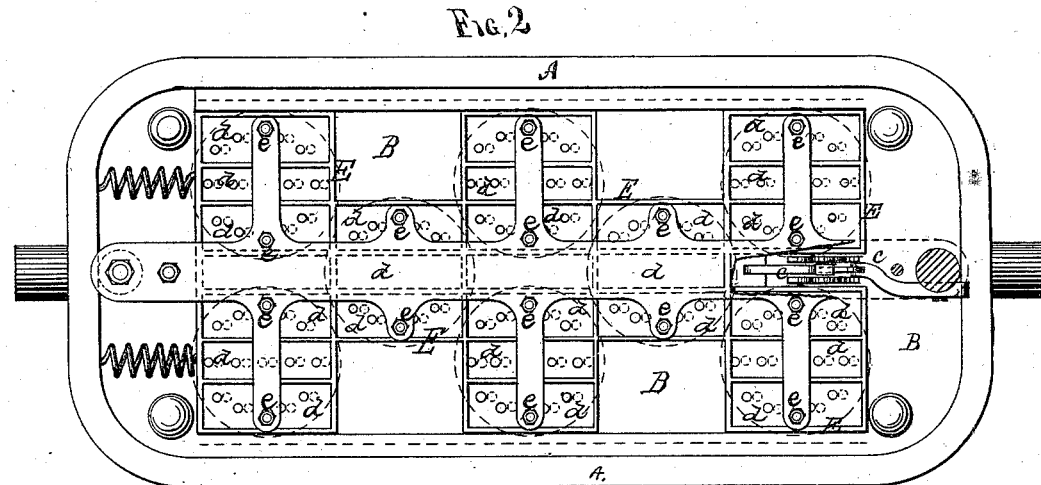
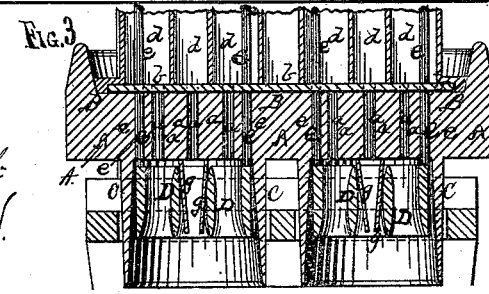

UNITED STATES PATENT OFFICE.

JAMES W. RUGER AND GEORGE J. HILL, OF BUFFALO, NEW YORK, ASSIGNORS TO J. W. RUGER & CO., OF SAME PLACE.

IMPROVEMENT IN MECHANISMS FOR CUTTING AND SUGARING CRACKERS.

Specification forming part of Letters Patent No. 163,332, dated May 18, 1875; application filed December 24, 1874.

*To all whom it may concern:*

Be it known that we, JAMES WALLACE RUGER and GEORGE JAY HILL, both of Buffalo, in the county of Erie and State of New York, (assignors to J. W. RUGER & CO., of same place,) have made certain Improvements in Machines for Cutting and Sugaring Cakes, Crackers, &c., of which the following is a specification:

This invention is to be applied to the cutters and cutter-frame of a cracker or cake cutting machine; and the invention consists in combining with the cutter or cutters a box (with or without compartments) for holding one or more colors of sugar, and with a movable perforated bottom, so that at every downward stroke of the cutter or cutters the sliding bottom moves, and the sugar falls in various shapes on the cake or cakes below. It further consists in an open clearer with corresponding divisions, through which the sugar falls, all as hereinafter described.

In the drawings, Figure 1 is a longitudinal sectional elevation, showing a number of cutters, &c.; Fig. 2, a plan view; Fig. 3, a vertical cross-section with the cutters pressed down.

A represents the usual cutter frame or trough, and moved up and down as in other cutting-machines. C C are the cutters, made to cut any variety of emblem or device in the dough-sheet beneath. B is the longitudinal bed or plate of the cutter-frame, and which has a number of perforations, *a a a*, through it, leading into the open clearers and cutters C C C. Above this perforated bed B, and lying flat upon it, is a sliding valve, *b*, with perforations corresponding to those in the bed B, but alternating, so that when the cutting-frame is still, or returned upward to its place, the perforations *a a* are covered by the solid parts of the valve; but when the valve is moved by its appropriate mechanism, (shown at *c*, Figs. 1 and 2,) or other suitable devices, the holes therein come precisely over those in the bed B. This is accomplished at every upward and downward movement of the cutter, alternately closing and unclosing the perforations. Above this valve *b* is arranged a series of boxes or sugaring devices, E E, with one, two, or more compartments, *d d*, which may be arranged in any shape or design desired. These compartments come down close to the valve *b*, as shown, and are intended to contain sugar of different colors, which, when the cutters are brought down upon the dough-sheet beneath, and the valve *b* opened by the catch or dog *c*, as before described, will allow a portion of the sugar to fall down upon the cake or cakes still in or just beneath the cutter, and thus ornament or "sugar" it.

By making the compartments of different designs, the "sugaring" may be made to assume any ornamental or fancy shape desired.

Hitherto, the sugaring of cakes, &c., has been done by hand, which causes great waste of the sugar, besides scattering it all around.

By our device the sugaring and cutting are done rapidly and at one operation, and places the sugar exactly where it is wanted.

D D are the clearers inside the cutters C C; but, instead of being solid, as is usual, they are made open, either entirely so, or else supplied with divisions conforming in arrangement and configuration to the compartments in the sugaring-box E. Thus, if there is but one compartment therein for only one color of sugar, the clearer will be entirely open; but if several colors of sugar are used to ornament the cakes, the clearer will be arranged with the divisions as above described, and clearly shown in Fig. 3. This is an important feature of our invention, as without this opening or openings in the clearer the sugar could not properly fall on the cakes beneath. *g g* are two vertical guides, which are secured to the bottom of the bed B, and work inside the clearer D, to guide the sugar from the compartments above, and keep each color separate, and thus retain the configuration.

The stationary sugaring devices or boxes E might be replaced by perforated revolving drums; but we prefer our devices substantially as described, our aim being to cut and sugar the cakes in one operation, thereby saving hand-work, and avoiding waste and scattering of the sugar. This is a very important improvement in such machines.

We claim—

1. In a cracker and cake cutting machine, in combination with the cutting-frame A, bed-plate B, with perforations $a\ a\ a$, the sugaring devices E E, having one or more compartments, $d\ d$, substantially as and for the purpose specified.

2. The combination, with a cutting-frame, perforated bed-plate, and sugaring device, of the perforated sliding valve $b$, substantially as and for the purpose described.

3. In combination with the cutters C C and sugaring devices E E, the open clearer D, substantially as and for the purpose specified.

In witness whereof we have hereunto signed our names in the presence of two subscribing witnesses.

J. W. RUGER.
GEO. J. HILL.

Witnesses:
  J. R. DRAKE,
  C. N. WOODWARD.